United States Patent
Chen et al.

(10) Patent No.: US 10,853,200 B2
(45) Date of Patent: Dec. 1, 2020

(54) CONSISTENT INPUT/OUTPUT (IO) RECOVERY FOR ACTIVE/ACTIVE CLUSTER REPLICATION

(71) Applicant: EMC IP Holding Company LLC, Hopkinton, MA (US)

(72) Inventors: Xiangping Chen, Sherborn, MA (US); Ying Hu, Northborough, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 154 days.

(21) Appl. No.: 16/264,825

(22) Filed: Feb. 1, 2019

(65) Prior Publication Data

US 2020/0250051 A1 Aug. 6, 2020

(51) Int. Cl.
*G06F 11/00* (2006.01)
*G06F 11/14* (2006.01)
*G06F 3/06* (2006.01)

(52) U.S. Cl.
CPC .......... *G06F 11/1471* (2013.01); *G06F 3/065* (2013.01); *G06F 3/067* (2013.01); *G06F 3/0619* (2013.01); *G06F 2201/82* (2013.01)

(58) Field of Classification Search
CPC ................................................. G06F 11/1471
See application file for complete search history.

(56) References Cited

U.S. PATENT DOCUMENTS

| | | | |
|---|---|---|---|
| 5,913,213 A | 6/1999 | Wikstrom et al. | |
| 6,253,274 B1 | 6/2001 | Boonie et al. | |
| 6,496,908 B1 | 12/2002 | Kamvysselis et al. | |
| 6,553,464 B1 | 4/2003 | Kamvysselis et al. | |
| 6,640,280 B1 | 10/2003 | Kamvysselis et al. | |
| 6,862,632 B1 | 3/2005 | Halstead et al. | |
| 6,883,018 B1 | 4/2005 | Meiri et al. | |
| 6,886,164 B2 | 4/2005 | Meiri | |
| 6,898,685 B2 | 5/2005 | Meiri et al. | |
| 6,910,075 B2 | 6/2005 | Marshak et al. | |
| 6,938,122 B2 | 8/2005 | Meiri et al. | |

(Continued)

OTHER PUBLICATIONS

Non-Final Office Action dated Feb. 5, 2020, U.S. Appl. No. 16/263,414, 22 pages.

(Continued)

*Primary Examiner* — Katherine Lin
(74) *Attorney, Agent, or Firm* — Daly, Crowley Mofford & Durkee, LLP (57) ABSTRACT

In one aspect, IO recovery mechanisms in active/active replication for storage clusters provide, for each write IO request: determining an extent of pages to be modified; acquiring a lock by a cluster local to the request and locally persisting data; atomically creating an entry in a local journal; and sending, by the local cluster, a data write request to a peer cluster. Upon receiving acknowledgement from the peer cluster of successful transmission, the replication journal entry is cleared, the extent is unlocked, and a notification is returned to the peer. In response to a failure event at the peer cluster after persisting the data at the local cluster and creating the journal entry at the local cluster, an aspect includes sending, to the peer cluster upon recovery of the peer cluster, the journal entry with respect to an extent corresponding to a time of the failure event.

20 Claims, 5 Drawing Sheets

(56) References Cited

U.S. PATENT DOCUMENTS

| | | |
|---|---|---|
| 6,944,726 B2 | 9/2005 | Yoder et al. |
| 6,968,369 B2 | 11/2005 | Veprinsky et al. |
| 6,973,549 B1* | 12/2005 | Testardi .................. G06F 9/526 711/150 |
| 6,976,139 B2 | 12/2005 | Halstead et al. |
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Mamhak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longmov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,475,124 B2 | 1/2009 | Jiang et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,327,103 B1 | 12/2012 | Can et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,380,928 B1 | 2/2013 | Chen et al. |
| 8,429,346 B1 | 4/2013 | Chen et al. |
| 8,468,180 B1 | 6/2013 | Meiri et al. |
| 8,515,911 B1 | 8/2013 | Zhou et al. |
| 8,539,148 B1 | 9/2013 | Chen et al. |
| 8,566,483 B1 | 10/2013 | Chen et al. |
| 8,578,204 B1 | 11/2013 | Ortenberg et al. |
| 8,583,607 B1 | 11/2013 | Chen et al. |
| 8,600,943 B1 | 12/2013 | Fitzgerald et al. |
| 8,677,087 B2 | 3/2014 | Meiri et al. |
| 8,683,153 B1 | 3/2014 | Long et al. |
| 8,694,700 B1 | 4/2014 | Natanzon et al. |
| 8,706,959 B1 | 4/2014 | Arnon et al. |
| 8,712,976 B1 | 4/2014 | Chen et al. |
| 8,719,497 B1 | 5/2014 | Don et al. |
| 8,732,124 B1 | 5/2014 | Arnon et al. |
| 8,775,388 B1 | 7/2014 | Chen et al. |
| 8,782,324 B1 | 7/2014 | Chen et al. |
| 8,782,357 B2 | 7/2014 | Halstead et al. |
| 8,799,601 B1 | 8/2014 | Chen et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,909,887 B1 | 12/2014 | Armangau et al. |
| 8,914,596 B2 | 12/2014 | Lecrone et al. |
| 8,930,746 B1 | 1/2015 | Chen et al. |
| 8,954,699 B1 | 2/2015 | Chen et al. |
| 8,966,211 B1 | 2/2015 | Arnon et al. |
| 8,977,812 B1 | 3/2015 | Chen et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,152,336 B1 | 10/2015 | Chen et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,355,112 B1 | 5/2016 | Armangau et al. |
| 9,378,106 B1 | 6/2016 | Ben-Moshe et al. |
| 9,384,206 B1 | 7/2016 | Bono et al. |
| 9,395,937 B1 | 7/2016 | Si et al. |
| 9,396,243 B1 | 7/2016 | Halevi et al. |
| 9,418,131 B1 | 8/2016 | Halevi et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,483,355 B1 | 11/2016 | Meiri et al. |
| 9,513,814 B1 | 12/2016 | Can et al. |
| 9,524,220 B1 | 12/2016 | Veprinsky et al. |
| 9,529,545 B1 | 12/2016 | Bono et al. |
| 9,542,125 B1 | 1/2017 | Chen |
| 9,558,083 B2 | 1/2017 | LeCrone et al. |
| 9,594,514 B1 | 3/2017 | Bono et al. |
| 9,606,739 B1 | 3/2017 | LeCrone et al. |
| 9,606,870 B1 | 3/2017 | Meiri et al. |
| 9,684,593 B1 | 6/2017 | Chen et al. |
| 9,710,187 B1 | 7/2017 | Si et al. |
| 9,753,663 B1 | 9/2017 | LeCrone et al. |
| 9,811,288 B1 | 11/2017 | Chen et al. |
| 9,817,766 B1 | 11/2017 | Si et al. |
| 9,933,947 B1 | 4/2018 | Vokaliga et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,037,369 B1 | 7/2018 | Bono et al. |
| 10,055,161 B1 | 8/2018 | Meiri et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,152,527 B1 | 12/2018 | Meiri et al. |
| 10,176,046 B1 | 1/2019 | Hu et al. |
| 10,235,066 B1 | 3/2019 | Chen et al. |
| 10,417,056 B2 | 9/2019 | Dice |
| 10,423,573 B1* | 9/2019 | Shaw .................. G06F 3/067 |
| 2006/0101081 A1* | 5/2006 | Lin .................. G06F 16/2343 |
| 2008/0288811 A1 | 11/2008 | Sudhakar |
| 2009/0063486 A1* | 3/2009 | Oza .................. G06F 11/2082 |
| 2009/0265352 A1 | 10/2009 | Holenstein et al. |
| 2010/0191884 A1 | 7/2010 | Holenstein et al. |
| 2011/0137879 A1 | 6/2011 | Dubey et al. |
| 2016/0098330 A1 | 4/2016 | Mu et al. |
| 2017/0039094 A1 | 2/2017 | Dice |
| 2017/0192863 A1* | 7/2017 | Eluri .................. G06F 11/2023 |
| 2017/0193070 A1 | 7/2017 | Miller et al. |
| 2017/0300668 A1 | 10/2017 | Bawa et al. |
| 2018/0181328 A1* | 6/2018 | Espeseth .................. G06F 9/52 |
| 2018/0260125 A1 | 9/2018 | Botes et al. |

OTHER PUBLICATIONS

Notice of Allowance and Issue Fee due dated Jun. 9, 2020, U.S. Appl. No. 16/396,880, 17 pages.
U.S Appl. No. 16/263,414, filed Jan. 31, 2019, David Meiri et al.
U.S. Appl. No. 16/050,247, filed Jul. 31, 2018, Schneider et al.
U.S. Appl. No. 16/177,782, filed Nov. 1, 2018, Hu et al.
U.S. Appl. No. 16/263,414, filed Jan. 31, 2019, Meiri et al.
U.S. Appl. No. 15/001,789, filed Jan. 20, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,188, filed Mar. 30, 2016, Meiri et al.
U.S. Appl. No. 15/499,297, filed Apr. 27, 2017, Kucherov et al.
U.S. Appl. No. 15/499,303, filed Apr. 27, 2017, Kucherov et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.

(56) References Cited

OTHER PUBLICATIONS

U.S. Appl. No. 15/971,325, filed May 4, 2018, Kucherov et al.
U.S. Appl. No. 15/971,445, filed May 4, 2018, Kucherov et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.

\* cited by examiner

CONSISTENT INPUT/OUTPUT (IO) RECOVERY FOR ACTIVE/ACTIVE CLUSTER REPLICATION

BACKGROUND

Data replication techniques enable organizations to protect data from loss, implement disaster recovery, or to migrate data between locations. There are various types of replication modes that can be utilized by an organization, and each mode comes with its own advantages and disadvantages. One popular mode of data replication is active/active replication in which a network of servers and applications concurrently perform input/output (IO) operations across a virtualized storage layer. This type of replication provides advantages such as continuous availability, as replication operations are not interrupted when one system or node in the network goes down.

However, an infrastructure that employs active/active replication requires some locking mechanism to enable concurrent updates to data from any site in the network. For example, if a host writes the first 4 KB of one page into one device and the last 4 KB of the same page into its peer device in an active/active setup, both sides will try to lock the page on both storage clusters, leading to a deadlock. Once a deadlock has been resolved, the system needs to maintain data consistency and ensure safe IO recovery when one or more components fails in the middle of locking and writing.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for implementing consistent input/output (IO) recovery in an active/active replication process for clusters of a storage system. The method includes designating one of the clusters as a lock winner. A lock winner designation indicates that the one of the clusters takes priority, with respect to another of the clusters, over a lock. For each write IO request received from an application, the method also includes: determining an extent of pages to be modified by the write IO request, acquiring the lock by one of the clusters determined to be local to the application issuing the write IO request, locally persisting data subject to the write IO request, and atomically creating a replication journal entry for IO recovery in a replication journal that is local to the one of the clusters that acquired the lock. The method also includes sending, by the local cluster, a data write request to a peer cluster of the clusters and, upon receiving acknowledgement from the peer cluster that the data write request was successfully transmitted, clearing the replication journal entry at the local cluster, unlocking the extent, and returning a notification to the peer cluster. The method also includes, in response to a failure event occurring at the peer cluster after persisting the data at the local cluster and creating the replication journal entry at the local cluster, sending, to the peer cluster upon recovery of the peer cluster, the replication journal entry with respect to an extent corresponding to a time of the failure event.

Another aspect may provide a system for implementing consistent input/output (IO) recovery in an active/active replication process for clusters of a storage system. The system includes a memory having computer-executable instructions. The system also includes a processor operated by a storage system. The processor executes the computer-executable instructions. When executed by the processor, the computer-executable instructions cause the processor to perform operations. The operations include designating one of the clusters as a lock winner. A lock winner designation indicates that the one of the clusters takes priority, with respect to another cluster of the clusters, over a lock. For each write IO request received from an application, the operations also include: determining an extent of pages to be modified by the write IO request, acquiring the lock by one of the clusters determined to be local to the application issuing the write IO request, locally persisting data subject to the write IO request, and atomically creating a replication journal entry for IO recovery in a replication journal that is local to the one of the clusters that acquired the lock. The operations also include sending, by the local cluster, a data write request to a peer cluster of the clusters and, upon receiving acknowledgement from the peer cluster that the data write request was successfully transmitted, clearing the replication journal entry at the local cluster, unlocking the extent, and returning a notification to the peer cluster. The operations also include in response to a failure event occurring at the peer cluster after persisting the data at the local cluster and creating the replication journal entry at the local cluster, sending, to the peer cluster upon recovery of the peer cluster, the replication journal entry with respect to an extent corresponding to a time of the failure event.

Another aspect may provide a computer program product for implementing consistent input/output (IO) recovery in an active/active replication process for clusters of a storage system. The computer program is embodied on a non-transitory computer readable medium. The computer program product includes instructions that, when executed by a computer at a storage system, causes the computer to perform operations. The operations include designating one of the clusters as a lock winner. A lock winner designation indicates that the one of the clusters takes priority, with respect to another cluster of the clusters, over a lock. For each write IO request received from an application, the operations include: determining an extent of pages to be modified by the write IO request, acquiring the lock by one of the clusters determined to be local to the application issuing the write IO request, and locally persisting data subject to the write IO request, and atomically creating a replication journal entry for IO recovery in a replication journal that is local to the one of the clusters that acquired the lock. The operations also include sending, by the local cluster, a data write request to a peer cluster of the clusters and, upon receiving acknowledgement from the peer cluster that the data write request was successfully transmitted, clearing the replication journal entry at the local cluster, unlocking the extent, and returning a notification to the peer cluster. The operations further include, in response to a failure event occurring at the peer cluster after persisting the data at the local cluster and creating the replication journal entry at the local cluster, sending, to the peer cluster upon recovery of the peer cluster, the replication journal entry with respect to an extent corresponding to a time of the failure event

BRIEF DESCRIPTION OF THE DRAWINGS

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Embodiments described herein provide extent lock resolution in a storage system that performs active/active replication. As indicated above, active/active replication refers to a mode of data replication in which a network of servers and applications concurrently perform input/output (IO) operations across a virtualized storage layer. This type of replication mode can create challenges, e.g., where a deadlock situation ensues when both sides of a replication system attempt to lock the same page at the same time. Techniques for resolving extent lock conflicts are disclosed in commonly assigned application entitled "Extent Lock Resolution In Active/Active Replication," filed on Jan. 31, 2019, the entire contents of which are incorporated herein by reference. The techniques described therein provide a solution for extent lock situations by designating one side of the storage network as a lock winner, giving that side of the network priority over locks and lock handling when both sides of the network simultaneously attempt to lock the same page during the active/active session. Once a deadlock has been resolved, the embodiments of the present disclosure provide a solution to maintain data consistency and ensure safe IO recovery should one or more components fails in the middle of locking and writing.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "I/O request" or simply "I/O" or "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a timestamp of the I/O.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, active/active replication refers to a mode of data replication in which a network of servers and applications concurrently perform input/output (IO) operations across a virtualized storage layer. This type of replication provides advantages such as continuous availability, as replication operations are not interrupted when one system or node in the network goes down.

In certain embodiments, an extent refers to a contiguous area of storage reserved for a file system that is represented as a range of blocks. For example, a file may consist of zero or more extents and one file fragment would require one extent.

In certain embodiments, a storage cluster may refer to a type of configuration that enables stretched clusters (e.g., clusters distributed across different geographic locations). Storage cluster configurations enable entities to provide load balancing and migrations between data centers.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Figure 1:
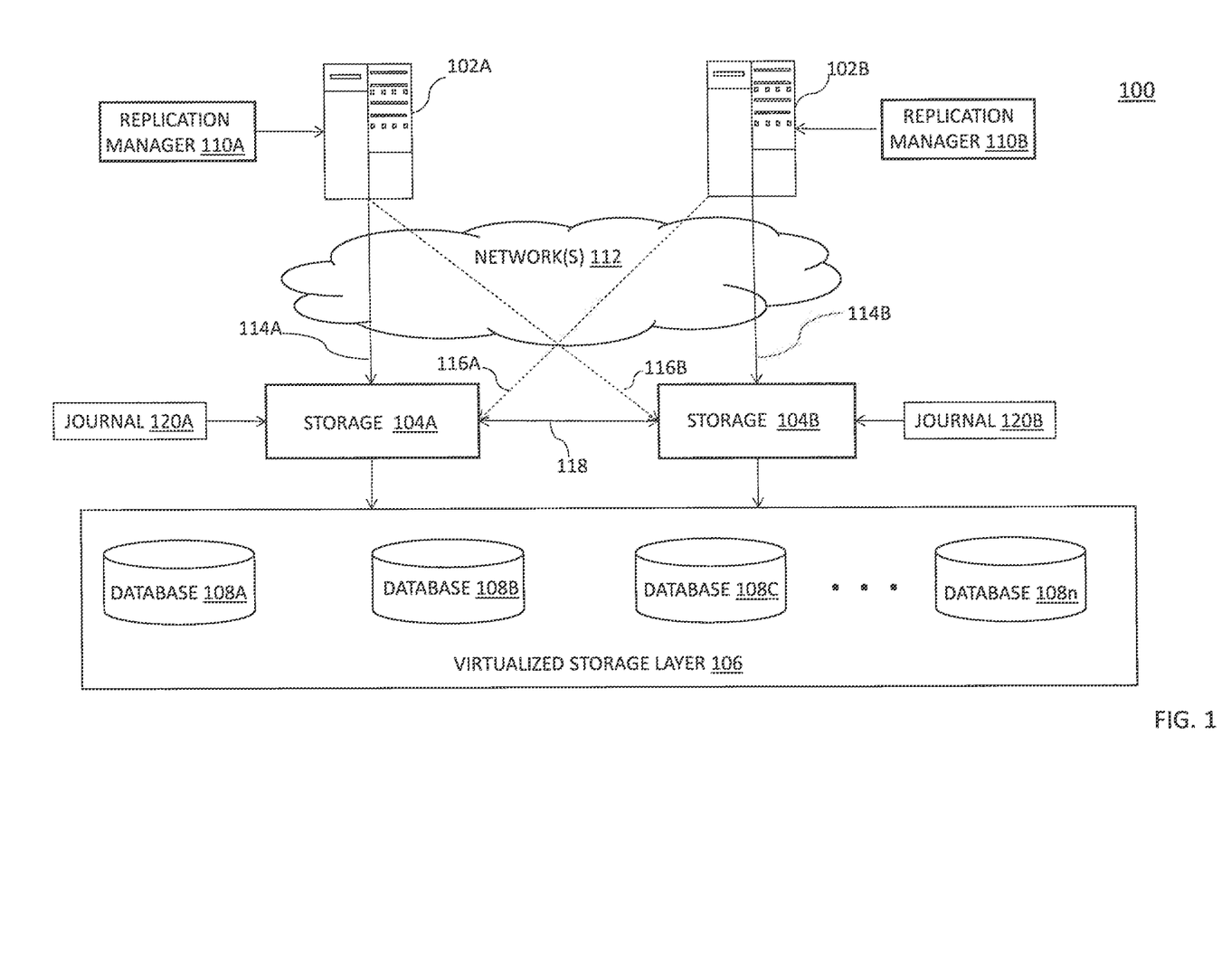
FIG. 1 is a block diagram of a storage system to perform consistent IO recovery in an active/active replication session in accordance with an illustrative embodiment.

Turning now to FIG. 1, an example storage system 100 for performing consistent IO recovery in an active/active replication session of a storage system will now be described. As indicated above, active/active replication refers to a mode of data replication in which a network of servers and applications concurrently perform input/output (IO) operations across a virtualized storage layer. This type of replication mode can create challenges, e.g., where a deadlock situation ensues when both sides of a replication system attempt to lock the same page at the same time. Deadlocks, or contention issues, can be resolved via the techniques described in the aforementioned application, Extent Lock Resolution In Active/Active Replication," Attorney Docket No. 112631; however, there is still a need to ensure data consistency and ensure safe IO recovery when one or more components fails during locking and writing. The embodiments described herein provide techniques for ensuring the data consistency and safe IO recovery.

The system 100 includes a first host system computer 102A and a second host system computer 102B. Each of the host system computers 102A and 102B is communicatively coupled to storage clusters 104A and 104B over one or more networks 112. The host system computers 102A and 102B may be implemented as high-speed computer processing devices, such as one or more mainframe computers capable of handling a high volume of activities conducted on behalf of end users of the active/active replication session.

The storage clusters 104A and 104B store a variety of data used by the host system computers 102A and 102B in implementing the active/active replication session. It is understood that the storage clusters 104A and 104B may be implemented using memory contained in their respective host system computers 102A and 102B or may be separate physical devices. The storage clusters 104A and 104B may be logically addressable as consolidated data sources across a distributed environment that includes the networks 112. In embodiments, the storage clusters 104A and 104B may each store a journal (120A and 120B, respectively) that is local to the respective storage cluster. Updates to the journals are performed atomically, that is, updates to one journal are not dependent upon updates to another journal. Each storage cluster 104A and 104B is responsible for and manages its own journal. Entries to a journal are made when a lock is acquired at a given storage cluster and data is persisted at that device. For example, if storage cluster 104a acquires a lock for an extent and persists data to that storage cluster, a journal entry is made in journal 120A accordingly. This information can be used for recovery if a component in the storage network fails.

The storage clusters 104A-104B may communicate over a replication link 118 to perform replication write operations. For example, in embodiments, storage cluster 104A receives a write IO request from host system computer 102A and, once the write operation has been completed on the storage cluster 104A, the write IO is replicated to the storage cluster 104B over the replication link 118. It is understood that other means of communication between the storage clusters 104A-104B may be employed, e.g., through one or more networks of networks 112.

The host system computers 102A-102B may operate as database servers and coordinate access to application data including data stored in the storage clusters 104A and 104B. The host system computers 102A-102B may be implemented using one or more servers operating in response to a computer program stored in a storage medium accessible by the servers. The host system computers 102A-102B may each operate as a network server (e.g., a web server) to communicate with any network entities, such as storage systems 104A and 104B.

Storage clusters 104A and 104B may be implemented as varying types of storage devices. For example, the storage clusters 104A and 104B may include one or more rotating magnetic storage devices, one or more rotating optical storage devices, and/or one or more solid state drives (SSDs), such as a flash drive. The storage devices 104A and 104B may include one or more hard disk drives (HDD), one or more flash drives, optical disks, as well as one or more other types of data storage devices. In other examples, the storage clusters 104A and 104B may include a set of one or more data storage arrays. A data storage array may be, for example, a redundant array of inexpensive disks (RAID) array, an optical storage array, or any other type of data storage array.

The networks 112 may be any type of known networks including, but not limited to, a storage area network (SAN), wide area network (WAN), a local area network (LAN), a global network (e.g. Internet), a virtual private network (VPN), and an intranet. The networks 112 may be implemented using wireless networks or any kind of physical network implementation known in the art, e.g., using cellular, satellite, and/or terrestrial network technologies. The networks 112 may also include short range wireless networks utilizing, e.g., BLUETOOTH™ and WI-FI™ technologies and protocols.

In some embodiments, host system computer 102A and storage cluster 104A reside in a first data center (not shown), and host system computer 102B and storage cluster 104B reside in a second data center. That is, host system computers 102A and 102B may reside in geographically disparate locations. In this embodiment, the host system computer 102A and the storage system 104A at the first data center are communicatively coupled through a local network (e.g., as shown by solid line 114A in FIG. 1), and the host system computer 102B and the storage system 104B may be communicatively coupled through a second local network (e.g., as shown by solid line 114B in FIG. 1). In some embodiments, the local communication networks 114A and 114B may include internal (e.g., short distance) communication links (e.g., InfiniBand (IB) link or Fibre Channel (FC) link) to transfer data between storage volumes for storing replicas (also referred to herein as snap sets).

In embodiments, the host system computer 102A at the first data center and the storage system 104B at the second data center may communicate remotely over a long distance network of the networks 112. Likewise, the host system computer 102B at the second data center and the storage system 104A at the first data center may communicate remotely over a long distance network of the networks 112. The long distance communication networks (shown in FIG. 1 as dotted lines 116A and 116B, respectively) may be long-distance communication networks of a storage area network (SAN), e.g., over an Ethernet or Internet (e.g., TCP/IP) link that may employ, for example, the iSCSI protocol.

Also shown in FIG. 1 is a virtualized storage layer 106 including virtual databases 108A-108n. The virtualized storage layer 106 represents a storage array virtualized across two or more physical sites to create a data presence mirrored between the sites and enables simultaneous writes to the two or more sites. The databases 108A-108n may reside in one or more of the storage clusters 104A-104B. The virtualized storage layer 106 is communicatively coupled to the host systems 102A-102B through the storage clusters 104A-104B via the networks 112.

In embodiments, as shown in FIG. 1, the host system computer 102A and the host system computer 102B each implements a replication manager application 110A and 110B, respectively, to manage the processes described herein. The host system computers 102A and 102B perform IO operations on the storage clusters 104A and 104B in an active/active replication session. In some embodiments, the IO operations for each of the host system computers 102A and 102B may be managed the respective replication manager applications 110A and 110B. As changes are made to data stored on storage clusters 104A and 104B via the IO operations from the host system computers 102A and 102B, replication manager applications 110A and 110B perform data replication to their local storage systems and to remote storage systems over the networks 112 in an active/active replication mode.

Data replication may be performed based on data replication policies that may define various settings for data recovery operations. For example, one policy may define a plurality of attributes, such as a frequency with which replicas are generated and how long each replica is kept at a storage system. In some embodiments, a policy may define metrics for use in snap set creation and replication process determinations.

In embodiments, replication manager applications 110A and 110B, through the host systems 102A and 102B, are configured to enable designation of one of the storage clusters to be a lock winner. In one embodiment, this designation can be determined by criteria such as a serial number of the storage cluster devices. For example, the host systems 102A and 102B compare the serial numbers of their local storage devices and, through their replication manager applications 110A and 110B, determine which serial number is higher. The storage device with the highest serial number is designated as the lock winner. This can be configured as an automated process that is performed by the replication manager applications or may be a manual process. In an embodiment, a user or administrator at one of the data centers can designate that the storage device residing at his/her data center become the lock winner. It will be understood that other means or criteria to designate a lock winner may be employed.

The replication managers 110A and 110B may also manage the tracking and updates to journals and journal entries performed for their respective local storage clusters 104A and 104B, as will be described further herein.

Figure 2A:
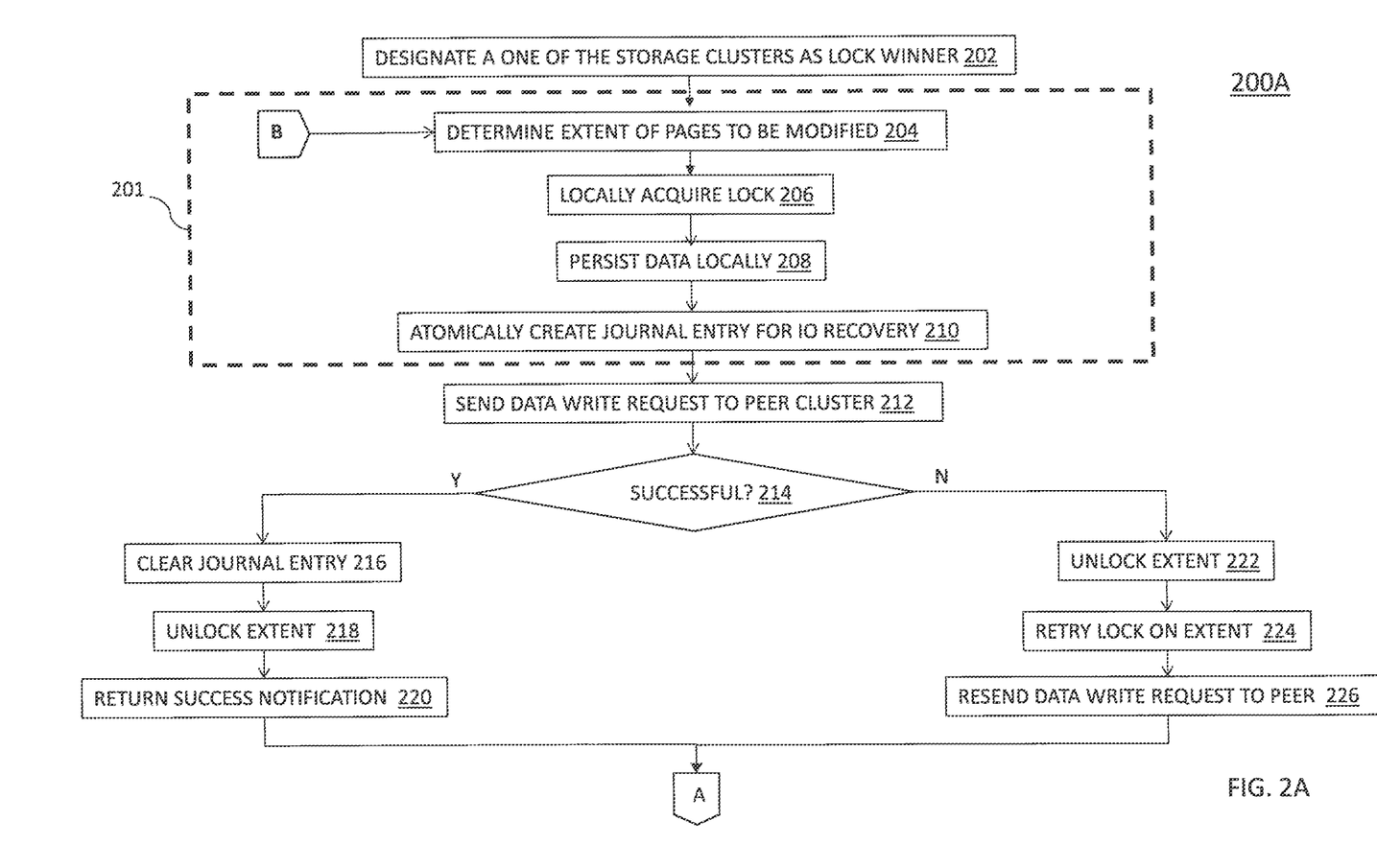
FIGS. 2A-2B are flow diagrams of processes for performing consistent IO recovery in an active/active replication session in accordance with an illustrative embodiment.
Figure 2B:
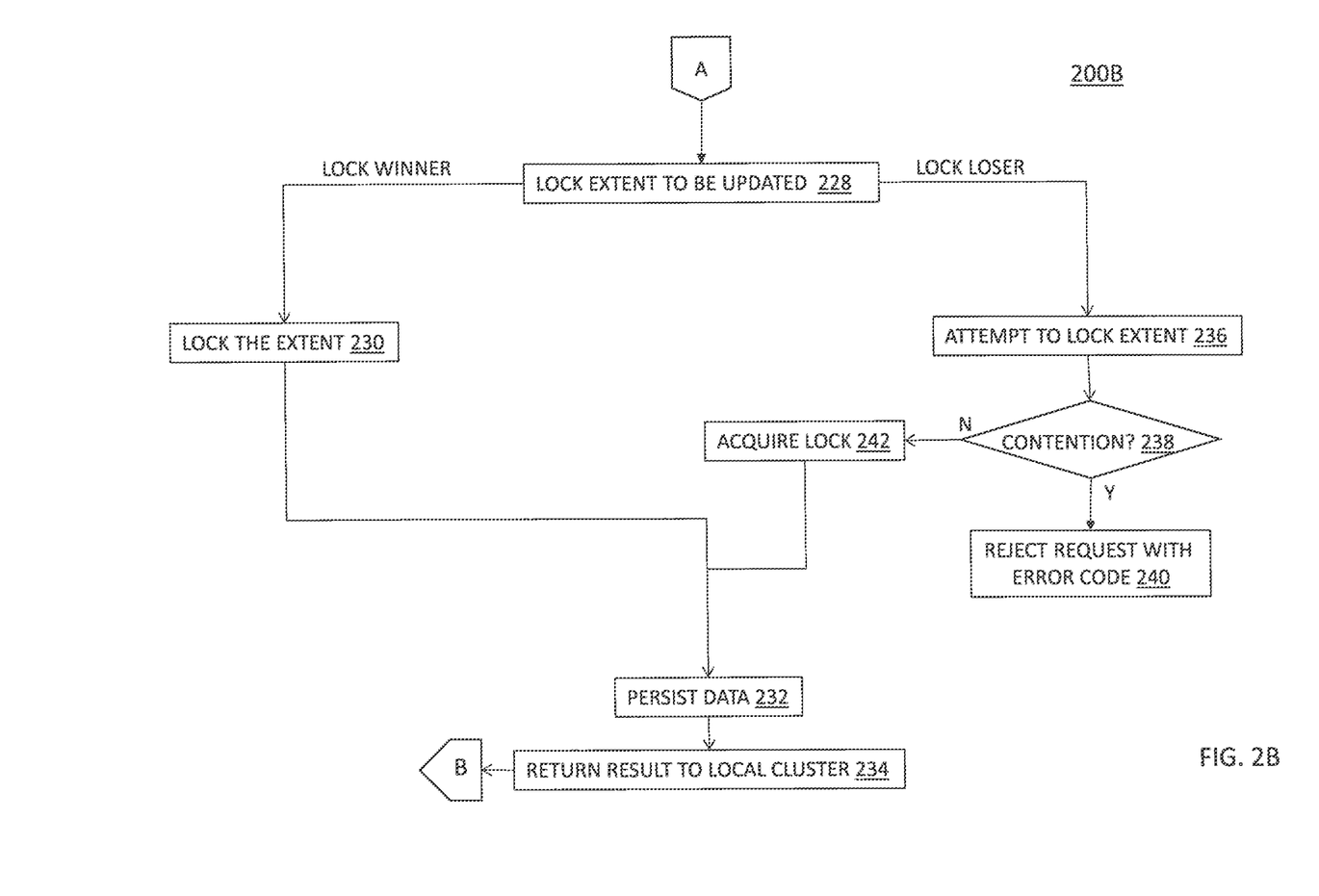

Turning now to FIG. 2A-2B, flow diagrams of processes 200A-200B for implementing consistent IO recovery for active/active cluster replication in a storage system will now be described. The Figures assume that the system (e.g., system 100 of FIG. 1 and/or system 300 of FIG. 3) is performing replication in an active/active replication mode.

In block 202 of FIG. 2A, a one of the storage clusters is designated as a lock winner. A lock winner designation indicates that the winning storage cluster will take priority, with respect to a second storage cluster, over acquisition of a lock. As indicated above, this designation of lock winner may be implemented using different criteria. For example, the designation may be an automated function based on serial numbers of the storage devices. In this example, the storage device having the highest serial number is automatically designated as the lock winner. In another embodiment, the designation can be made by user selection. In either embodiment, the storage device designated as the lock winner is assigned an attribute by the system, such that the host systems 102A-102B implementing the active/active replication session can identify which storage system has been designated the lock winner.

The activities in blocks 204-210 are performed for each write IO request received from an application (e.g., an application executing on one of the host systems 102A/102B), regardless of whether the cluster is a designated winner or loser (201). The process in blocks 204-210 assume that a write IO request has been issued by one of the applications executing on host system computers 102A/102B.

In block 204, an extent of pages to be modified by the write IO request is identified. In block 206, a lock is acquired locally; that is, the storage cluster that is local to the host system issuing the write IO request will acquire the lock locally. For example, if host system computer 102A issued the write IO request, then the storage cluster 104A (which is local to the host system computer 102A) will acquire the lock. In the event of a locking contention, the storage cluster waits for the lock to become available to an IO timeout value to be reached. If the storage cluster is unable to acquire the lock after an IO timeout, the storage cluster returns a failure notification to the host executing the application and requests that the host system retry the lock at a later time.

In block 206, upon successfully acquiring the lock, the data subject to the local write IO request is persisted. For example, local storage cluster 104A acquires the lock and persists the data locally. In block 210, the local storage cluster atomically creates a journal entry for IO recovery. It is noted that the processes of blocks 208 and 210 are performed prior to sending data to the peer storage cluster for replication. This is to facilitate replication IO recovery in the middle of a write operation. For example, if a local node crashes before the data is persisted locally and a journal entry is made, nothing has been changed with respect to both clusters. If the local node crashes after the data is persisted, the journal entry will be replayed after the node returns online and the replication operation can be re-executed. There is no need to crate a journal entry on the peer cluster as the operation completion is handled by the local cluster.

In block 212, the storage cluster that acquired the lock sends a data write request to the peer cluster (e.g., storage cluster 104A sends the data write request to cluster 104B to replicate the data at the peer storage cluster). In block 214, it is determined whether the peer cluster received the data write request. If the peer cluster successfully receives the data write request, in block 216, the sending cluster (e.g., the cluster that transmitted the data write request) clears the journal entry from the journal, unlocks the extent 218, and returns a notification of success to the host system computer that issued the write IO request. The process 200A then continues to process 200B of FIG. 2B.

Returning to block 214, if the receiving cluster does not return a success notification to the sending cluster, the sending cluster unlocks the extent in block 222 to break the deadlock, retries the lock on the extent in block 224, and resends the data write request to the peer cluster in block 226. In addition, the sending cluster may read the data from disk in the event the data changed or was updated during blocks 222 and 224 (during the time the sending cluster unlocked the extent and retried the lock).

In block 214, the receiving cluster may return with a lock contention error. The journal only stores the extents needed for replication and does not store the exact content. Between unlock and lock operations, it is possible that persisted data content gets modified by another replication write request from a peer cluster. If this happens, the replication IO or journal recovery flow will have the most up-to-date content persisted and that data can be pushed to the peer cluster. In this manner, both clusters will contain the same content.

Returning to block 226, once the data write request has been resent, the process 200A continues to process 200B in FIG. 2B. The process 200B in FIG. 2B is performed from the perspective of the peer storage cluster (e.g., storage cluster 104B) as either the designated lock winner (in blocks 230, 232, and 234) or lock winner (in blocks 236, 238, 240, 242, 232, and 234).

The process 200B is performed for the replication data write request received at the peer cluster. In block 228, the extent to be updated for the replication data write request is locked. This extent lock process varies based on whether the peer storage cluster is a designated lock winner or loser. Thus, in FIG. 2B, as the lock winner, the peer storage cluster locks the extent in block 230, persists the data in block 232, and returns the result to the storage cluster from which the data write request was received (e.g., storage cluster 104A) in block 234. The process 200B returns to process 200A.

As the lock loser, the cluster designated as lock loser (e.g., peer storage cluster 104B) attempts to lock the extent in block 236. It is determined whether a contention for the lock has occurred in block 238. If so, the lock loser rejects the data write request with an error code in block 240. On the other hand, if no contention has occurred, the lock loser acquires the lock in block 242, persists the data in block 232, and returns the result to its peer cluster (e.g., storage cluster 104A) in block 234. The process 200B returns to process 200A.

Figure 3:
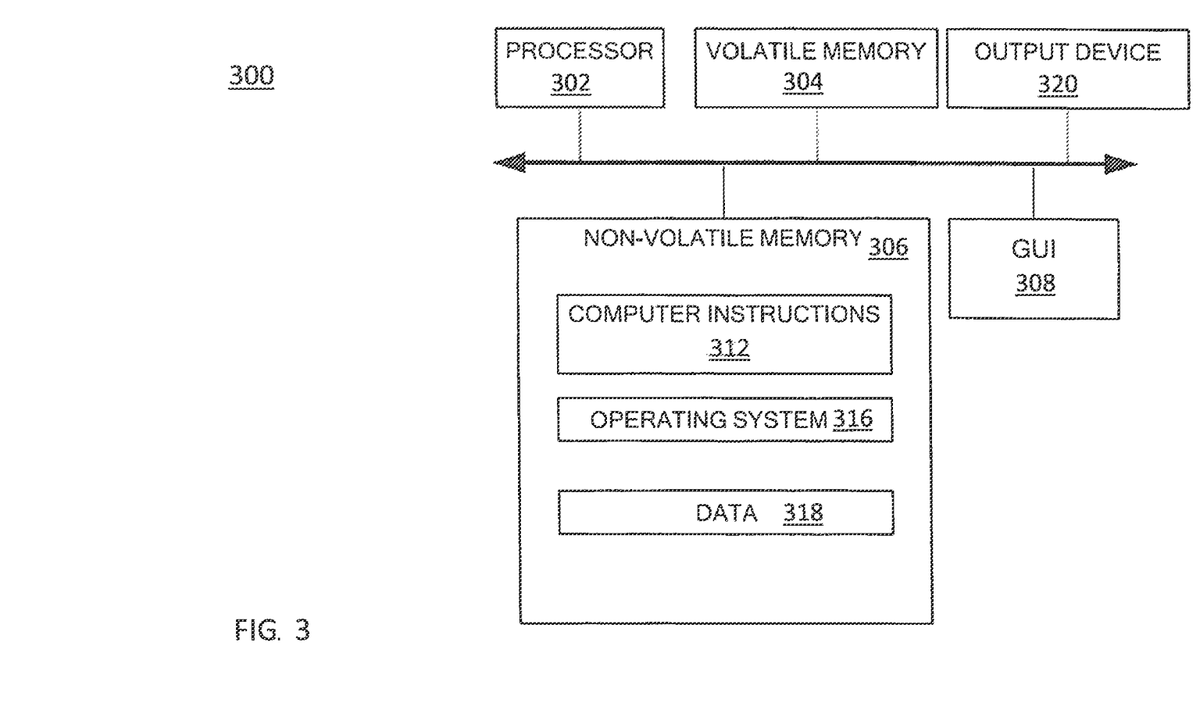
FIG. 3 is a block diagram of a hardware device that may perform at least a portion of the processes shown in FIGS. 2A-2B.

In some embodiments, the host system computers 102A-102B may be implemented as one or more computers, such as a computer 300 as shown in FIG. 3. Computer 300 may include processor 302, volatile memory 304 (e.g., RAM), non-volatile memory 306 (e.g., a hard disk drive, solid state drive such as a flash drive, a hybrid magnetic and solid state drive, etc.), graphical user interface (GUI) 308 (e.g., a mouse, a keyboard, a display, and so forth) and input/output (I/O) device 320. Non-volatile memory 306 stores computer instructions 312, an operating system 316 and data 318 such that, for example, the computer instructions 312 are executed by the processor 302 out of volatile memory 304 to perform at least a portion of the processes 200A-200B shown in FIGS. 2A-2B. Program code may be applied to data entered using an input device of GUI 308 or received from I/O device 320.

Processes 200A-200B shown in FIGS. 2A-2B are not limited to use with the hardware and software of FIG. 3 and may find applicability in any computing or processing environment and with any type of machine or set of machines that is capable of running a computer program. Processes 200A-200B may be implemented in hardware, software, or a combination of the two.

The processes described herein are not limited to the specific embodiments described. For example, processes 200A-200B are not limited to the specific processing order shown in FIGS. 2A-2B. Rather, one or more blocks of processes 200A-200B may be re-ordered, combined or removed, performed in parallel or in serial, as necessary, to achieve the results set forth herein.

Processor 302 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general-purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow charts of FIG. 2A-2B, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 4:
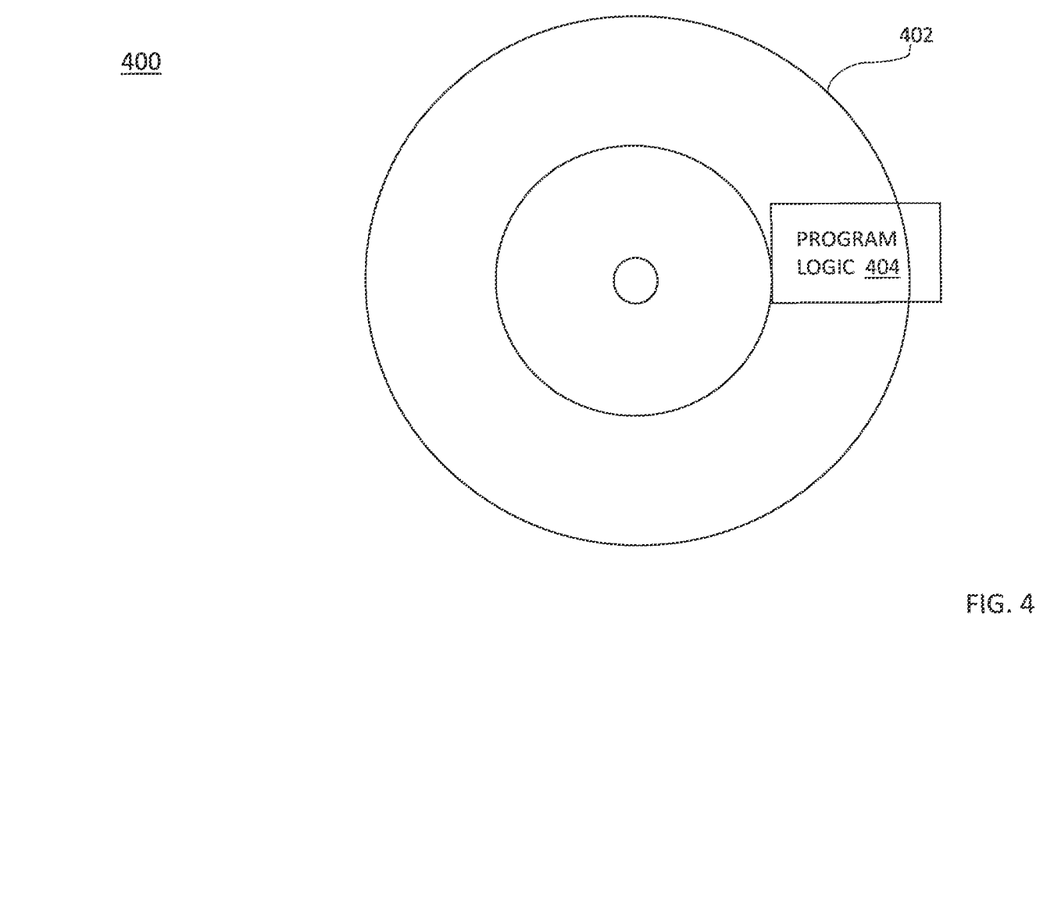
FIG. 4 is a simplified block diagram of an apparatus that may be used to implement at least a portion of the systems of FIGS. 1 and 4 and at least a portion of the process of FIGS. 2A-2B.

For example, when the program code is loaded into and executed by a machine, such as the computer of FIG. 3, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 4 shows Program Logic 404 embodied on a computer-readable medium 402 as shown, and wherein the Logic is encoded in computer-executable code configured for carrying out the reservation service process of this invention and thereby forming a Computer Program Product 400. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for consistent input/output (IO) recovery in an active/active replication process for clusters of a storage system, the method comprising:
    designating one of the clusters as a lock winner, a lock winner designation indicating the one of the clusters takes priority, with respect to another cluster of the clusters, over a lock; and
    for each write IO request received from an application, performing:
    determining an extent of pages to be modified by the write IO request;
    acquiring the lock by one of the clusters determined to be local to the application issuing the write IO request, and locally persisting data subject to the write IO request;
    atomically creating a replication journal entry for IO recovery in a replication journal that is local to the one of the clusters that acquired the lock;
    sending, by the local cluster, a data write request to a peer cluster of the clusters;
    upon receiving acknowledgement from the peer cluster that the data write request was successfully transmitted, clearing the replication journal entry at the local cluster, unlocking the extent, and returning a notification to the peer cluster; and
    in response to a failure event occurring at the peer cluster after persisting the data at the local cluster and creating the replication journal entry at the local cluster, sending, to the peer cluster upon recovery of the peer cluster, the replication journal entry with respect to an extent corresponding to a time of the failure event.

2. The method of claim 1, wherein acquiring the lock by one of the clusters determined to be local to the application issuing the write IO request comprises:
    attempting to lock the extent;
    determining whether a lock contention error has occurred with respect to the attempt to lock the extent; and
    waiting for the lock to become available or a timeout value to be reached;
    wherein the lock is acquired when the lock becomes available.

3. The method of claim 2, wherein upon determining the lock contention has occurred and the timeout window has been reached, the method comprises returning a fail notification to the application;
    wherein the application, in response to receiving the fail notification, is configured to retry acquisition of the lock at a later time.

4. The method of claim 1, wherein upon receiving a lock contention error from the peer cluster indicating the lock contention has occurred, the method comprises:
    unlocking the extent by the local cluster;
    retrying locking the extent by the local cluster; and
    resending the write request to the peer cluster from the local cluster.

5. The method of claim 1, wherein for each replication data write request from the local cluster, the method further comprises:
    attempting to lock the extent of the replication data write request by the peer cluster;
    upon determining a lock contention exists:
        waiting, by the peer cluster as the designated lock winner, for the lock to become available; and
        rejecting, by the peer cluster as the designated as a lock loser, the replication data write request with a lock contention error code; and
    upon determining no lock contention exists or once the lock becomes available, persisting the data at the peer cluster upon a successful lock operation for the extent.

6. The method of claim 1, wherein the replication journal stores extents subject to replication.

7. The method of claim 1, wherein the IO write request writes to a logical x-page address of the local cluster and the peer cluster.

8. A system for consistent input/output (IO) recovery in an active/active replication process for clusters of a storage system, the system comprising:
    a memory comprising computer-executable instructions; and
    a processor executing the computer-executable instructions, the computer-executable instructions when executed by the processor cause the processor to perform operations comprising:
    designating one of the clusters as a lock winner, a lock winner designation indicating the one of the clusters takes priority, with respect to another cluster of the clusters, over a lock; and
    for each write IO request received from an application, performing:
    determining an extent of pages to be modified by the write IO request;
    acquiring the lock by one of the clusters determined to be local to the application issuing the write IO request, and locally persisting data subject to the write IO request;
    atomically creating a replication journal entry for IO recovery in a replication journal that is local to the one of the clusters that acquired the lock;
    sending, by the local cluster, a data write request to a peer cluster of the clusters;
    upon receiving acknowledgement from the peer cluster that the data write request was successfully transmitted, clearing the replication journal entry at the local cluster, unlocking the extent, and returning a notification to the peer cluster; and
    in response to a failure event occurring at the peer cluster after persisting the data at the local cluster and creating the replication journal entry at the local cluster, sending, to the peer cluster upon recovery of the peer cluster, the replication journal entry with respect to an extent corresponding to a time of the failure event.

9. The system of claim 8, wherein acquiring the lock by one of the clusters determined to be local to the application issuing the write IO request comprises:
attempting to lock the extent;
determining whether a lock contention error has occurred with respect to the attempt to lock the extent; and
waiting for the lock to become available or a timeout value to be reached;
wherein the lock is acquired when the lock becomes available.

10. The system of claim 9, wherein upon determining the lock contention has occurred and the timeout window has been reached, the method comprises returning a fail notification to the application;
wherein the application, in response to receiving the fail notification, is configured to retry acquisition of the lock at a later time.

11. The system of claim 8, wherein upon receiving a lock contention error from the peer cluster indicating the lock contention has occurred, the operations comprise:
unlocking the extent by the local cluster;
retrying locking the extent by the local cluster; and
resending the write request to the peer cluster from the local cluster.

12. The system of claim 8, wherein for each replication data write request from the local cluster, the operations further comprise:
attempting to lock the extent of the replication data write request by the peer cluster;
upon determining a lock contention exists:
waiting, by the peer cluster as the designated lock winner, for the lock to become available; and
rejecting, by the peer cluster as the designated lock loser, the replication data write request with a lock contention error code; and
upon determining no lock contention exists or once the lock becomes available, persisting the data at the peer cluster upon a successful lock operation for the extent.

13. The system of claim 8, wherein the replication journal stores extents subject to replication; and
wherein the IO write request writes to a logical x-page address of the local cluster and the peer cluster.

14. A computer program product for consistent input/output (IO) recovery in an active/active replication process for clusters of a storage system, the computer program product embodied on a non-transitory computer readable medium and including instructions that, when executed by a computer causes the computer to perform operations comprising:
designating one of the clusters as a lock winner, a lock winner designation indicating the one of the clusters takes priority, with respect to another cluster of the clusters, over a lock; and
for each write IO request received from an application, performing:
determining an extent of pages to be modified by the write IO request;
acquiring the lock by the one of the clusters determined to be local to the application issuing the write IO request, and locally persisting data subject to the write IO request;
atomically creating a replication journal entry for IO recovery in a replication journal that is local to the one of the clusters that acquired the lock;
sending, by the local cluster, a data write request to a peer cluster of the clusters;
upon receiving acknowledgement from the peer cluster that the data write request was successfully transmitted, clearing the replication journal entry at the local cluster, unlocking the extent, and returning a notification to the peer cluster; and
in response to a failure event occurring at the peer cluster after persisting the data at the local cluster and creating the replication journal entry at the local cluster, sending, to the peer cluster upon recovery of the peer cluster, the replication journal entry with respect to an extent corresponding to a time of the failure event.

15. The computer program product of claim 14, wherein acquiring the lock by one of the clusters determined to be local to the application issuing the write IO request comprises:
attempting to lock the extent;
determining whether a lock contention error has occurred with respect to the attempt to lock the extent; and
waiting for the lock to become available or a timeout value to be reached;
wherein the lock is acquired when the lock becomes available.

16. The computer program product of claim 15, wherein upon determining the lock contention has occurred and the timeout window has been reached, the operations further comprise returning a fail notification to the application; and
wherein the application, in response to receiving the fail notification, is configured to retry acquisition of the lock at a later time.

17. The computer program product of claim 14, wherein upon receiving a lock contention error from the peer cluster indicating the lock contention has occurred, the operations further comprise:
unlocking the extent by the local cluster;
retrying locking the extent by the local cluster; and
resending the write request to the peer cluster from the local cluster.

18. The computer program product of claim 14, wherein for each replication data write request from the local cluster, the operations further comprise:
attempting to lock the extent of the replication data write request by the peer cluster;
upon determining a lock contention exists:
waiting, by the peer cluster as the designated lock winner, for the lock to become available; and
rejecting, by the peer cluster as the designated lock loser, the replication data write request with a lock contention error code; and
upon determining no lock contention exists or once the lock becomes available, persisting the data at the peer cluster upon a successful lock operation for the extent.

19. The computer program product of claim 14, wherein the replication journal stores extents subject to replication.

20. The computer program product of claim 14, wherein the IO write request writes to a logical x-page address of the local cluster and the peer cluster.

* * * * *